United States Patent
Bernstein et al.

(10) Patent No.: US 6,728,726 B1
(45) Date of Patent: Apr. 27, 2004

(54) PREFETCHING AND CACHING PERSISTENT OBJECTS

(75) Inventors: Philip A. Bernstein, Bellevue, WA (US); Shankar Pal, Redmond, WA (US); David R. Shutt, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/263,408

(22) Filed: Mar. 5, 1999

(51) Int. Cl.[7] .............................................. G06F 17/30
(52) U.S. Cl. ............................ 707/103; 707/3; 707/204
(58) Field of Search ..................... 707/3–5, 100–104.1, 707/204; 711/204; 709/229, 129

(56) References Cited

U.S. PATENT DOCUMENTS

| | | | | |
|---|---|---|---|---|
| 5,542,078 A | * | 7/1996 | Martel et al. | 707/101 |
| 5,680,573 A | * | 10/1997 | Rubin et al. | 711/129 |
| 5,765,159 A | * | 6/1998 | Srinivasan | 707/102 |
| 6,078,926 A | * | 6/2000 | Jensen et al. | 707/103 R |
| 6,374,252 B1 | * | 4/2002 | Althoff et al. | 707/102 |

* cited by examiner

Primary Examiner—Shahid Alam
Assistant Examiner—Jean Bolte Fleurantin
(74) Attorney, Agent, or Firm—Woodcock Washburn LLP

(57) ABSTRACT

Prefetching and caching persistent objects is disclosed. The system creates a structure context used to identify a set containing a first object and other related objects. The objects have attributes, where each attribute is identified by a name. Upon a fetch of an attribute in the first object, the system also fetches related data. The related data includes other attributes in the object, and attributes in the other objects of the set having the same name as the attribute fetched for the first object.

8 Claims, 5 Drawing Sheets

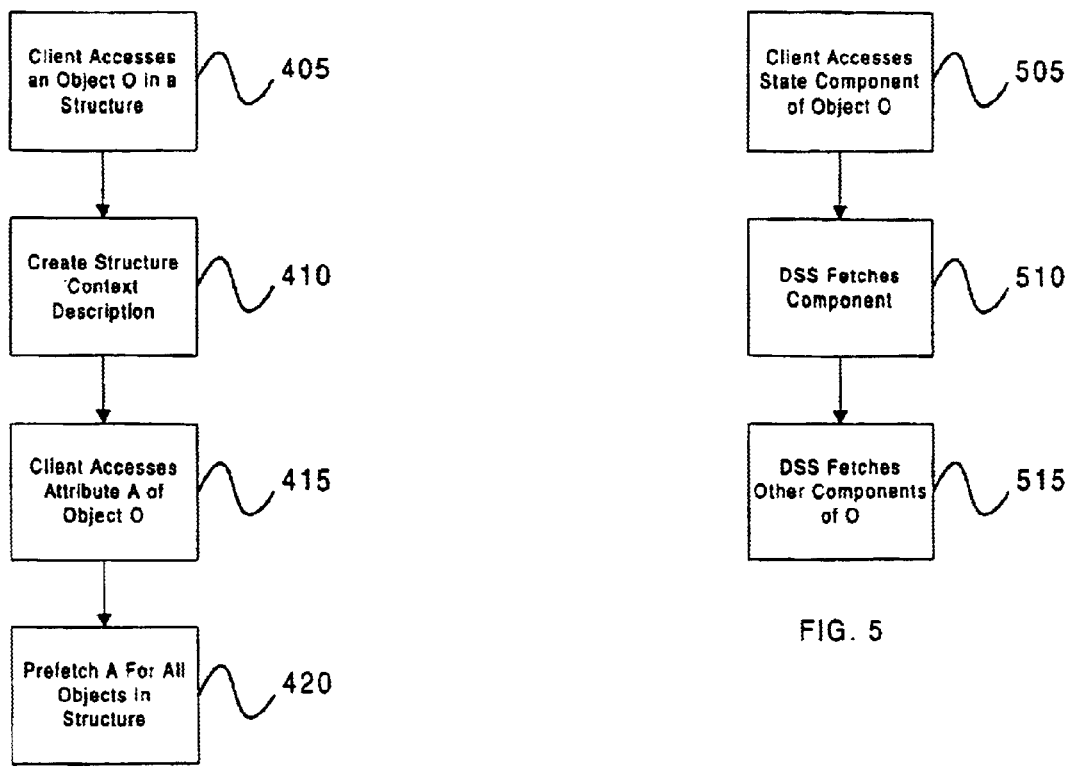
FIG. 4
FIG. 5
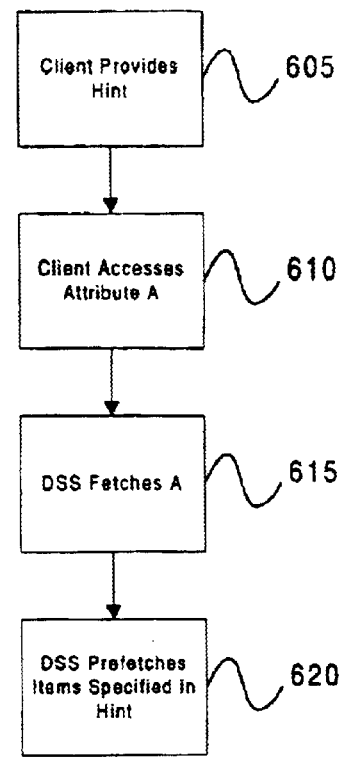
FIG. 6

PREFETCHING AND CACHING PERSISTENT OBJECTS

FIELD OF THE INVENTION

This invention relates generally to computer data storage systems, and more particularly to prefetching and caching objects from a data storage system.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright © 1998, 1999, Microsoft Corporation, All Rights Reserved.

BACKGROUND OF THE INVENTION

The number of applications that use object-oriented techniques and languages continues to increase at a rapid pace. This growth in object-oriented applications has resulted in a corresponding growth in the use of object databases and repositories. Object databases and repositories provide for the persistent storage of object data in the same way that a conventional database provides for the storage of tables containing data. Object repositories and object-oriented databases are similar in that they both store data in an object format, however repositories in addition typically provide for the storage of metadata, that is, data about the object data, along with the object data. This metadata typically comprises information such as object formats and interfaces, object versions, check-in/check-out dates and personnel, database schemas, etc.

An object, as is known in the art, is a data structure that has a persistent state. The persistent state consists of attributes, which comprise scalar values and object references. A scalar value is a value such as a string, integer or boolean. An object reference specifies one side of a binary relationship between two objects that refer to each other. In other words, the reference is to another object, which in turn refers back to the referring object. Each attribute is identified by a name, and each attribute has a data type. The data type for an attribute identifies either the type of scalar value for the attribute or the type of relationship defined by the attribute.

In addition to attributes, the state of an object includes structures. A structure contains a group of attributes that are organized according to a particular data structure. This data structure can be a collection (also referred to as a set), sequence, array, table, or record structure. Each structure conforms to a named structure type, which defines the particular data structure (collection, sequence, array, etc.) and the types of attributes the structure can contain. Like any attribute, an attribute in a structure can be a scalar value or object reference. A structure that contains object references is called an object structure.

In addition to being part of the state of an object, a structure can exist independently of other objects. For example, a structure may contain a group of objects that is the result returned by a data storage system when it executes a query.

A persistent object can also have operations. The operations can be read and write operations that are generic, in that they apply to all types of objects, or that are customized, in that they apply only to particular objects or to particular types of objects. This invention applies to persistent objects with any kinds of operations, whether they are generic or customized.

Each object conforms to one or more types, where each type is identified by a name. An object type defines a set of attribute types and/or structure types that an object of the given type can contain.

An object is typically an instance of a class. A class is a body of code that implements one or more object types. The class includes code to produce new objects of each type that it implements and code to perform various operations on objects of types that it implements and on attributes and structures of such objects. The types of operations performed vary depending on the class, and generally include read and write operations for the attributes and structures of an object.

An object-oriented application generally accesses objects or collections of objects one at a time in a serial fashion. In addition, it tends to also retrieve a small data item on each of these accesses. For example, an application may iterate through a collection of objects, examining one or more attributes in each object of the collection. Alternatively, an application may examine a current object, and based on data in the object or on other factors, invoke an operation to cause the data storage system to retrieve another related object based on a relationship between the current object and the related object.

While object-oriented databases and repositories provide a consistent mechanism for object persistence, the serial manner in which object-oriented applications access objects in persistent storage can cause undesirable performance degradation. In a typical data storage system, each access to a data item incurs a relatively high fixed overhead to interface with the persistent storage, and a relatively low incremental cost to actually retrieve the desired data item. This access cost is compounded by the fact that a large number of accesses are typically required to obtain moderate amounts of data related to a particular object or grouping of objects.

Therefore, there is a need in the art for a mechanism to increase the performance of object-oriented systems. The mechanism should allow applications to access objects using current methods, while taking advantage of common patterns of use to decrease the time required to access objects.

SUMMARY OF THE INVENTION

The above-mentioned shortcomings, disadvantages and problems are addressed by the present invention, which will be understood by reading and studying the following specification.

The systems and methods presented implement various strategies to prefetch relevant data items when an application first accesses an initial data item included in the state of an object. For the purposes of this application, prefetching means retrieving data for an object or related objects prior to an explicit request for access to the data by the application.

One such system for performing prefetches comprises a data storage system that provides persistent storage for object data comprising the state of the object. The data storage system uses an underlying physical storage system to actually store the data on a persistent storage unit. The physical storage system could be a hardware device, such as a disk, or a combination of hardware and software, such as a relational database system operating on a computer and disk. The data storage system includes software components that implement various strategies to prefetch data and store the data in a cache. The cache can be located in memory allocated to the data storage system, in memory allocated to an application using the data storage system to fetch object data, or in a physical storage system allocated to the data storage system. The data storage system or application to which the cache memory is allocated could be on a server system, a middle-tier system, or a client system.

In one method used to prefetch data, a data storage system provides access to an initial object whose state includes a structure that contains one or more other objects. The structure that contains those other objects is called the "structure context" of those other objects. The system creates a structure context description that "remembers" the objects in the structure and associates that structure context description with every object in the structure. When data for an attribute is fetched from one object in the structure (i.e. the object's structure context), data for the corresponding attribute is prefetched from the other objects in the structure, incurring a minimal incremental cost per item prefetched. The prefetched attribute data is held in a cache for later use. If the application later needs attribute data from an object in the structure, the system retrieves the attribute data from the cache if it is present, thereby avoiding the high fixed overhead cost of accessing the persistent storage for each attribute that can be successfully retrieved from the cache.

In an alternative method, a structure may be the result returned by the data storage system when it executes a query. The data storage system stores the structure, creates a structure context description that remembers the identifier of the stored structure, and associates that structure context description with every object in the structure. As before, when data for an attribute is fetched from one object in the structure, data for the corresponding attribute is prefetched from the other objects in the structure and held in a cache for later use.

The prefetch strategies summarized above, and various other methods implementing prefetch strategies, will be described in detail in the next section.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 4–7 are flow diagrams illustrating methods implementing various prefetch strategies according to exemplary embodiments of the invention.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

In the detailed description that follows, reference is made to two types of methods. The first type of method is an object method. Object methods are procedures or functions associated with an object type. The second type of method is a system method, that is, a method according to an embodiment of the invention. When it is clear from the context in which the term method is used, the particular type of method (object or system) may be omitted.

The detailed description is divided into five sections. In the first section, the hardware and the operating environment in conjunction with which embodiments of the invention may be practiced are described. In the second section, a system level overview of the invention is presented. In the third section, methods of an exemplary embodiment of the invention are provided. In the fourth section, a particular COM (Microsoft's Component Object Model) object repository implementation of the invention is described. Finally, in the fifth section, a conclusion of the detailed description is provided.

Hardware and Operating Environment

Figure 1:
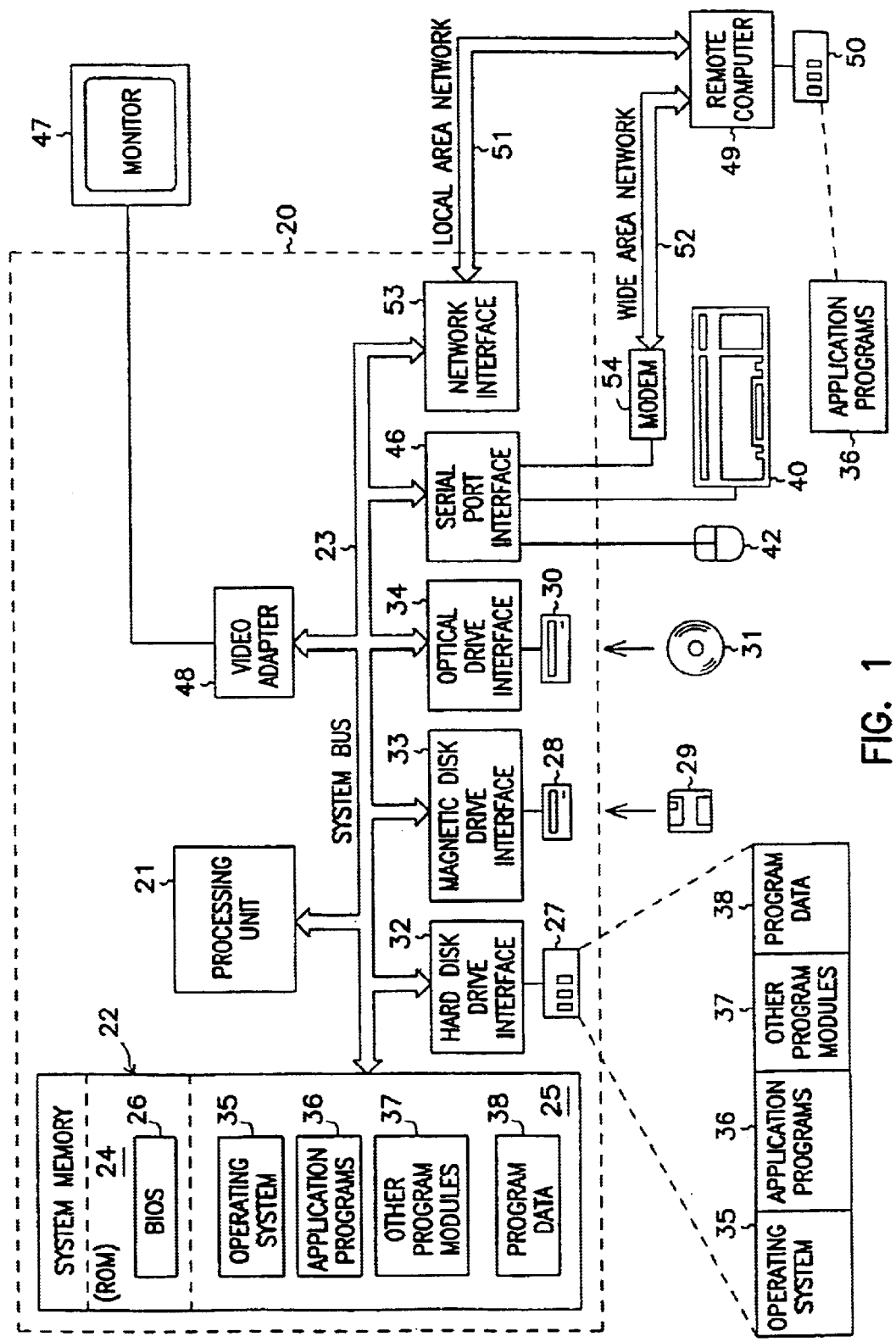
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as a remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

A system level overview of the operation of an exemplary embodiment of the invention is described by reference to FIG. 2. The concepts of the invention are described as operating in a multiprocessing, multithreaded virtual memory operating environment on a computer, such as computer 20 in FIG. 1. The exemplary operating environment comprises what is known in the art as a three-tier system. In this environment client application 205 interfaces with a data storage system 250, which interfaces with a physical storage system 270.

In one exemplary embodiment of the invention, data storage system 250 is an objectoriented database providing persistent storage of objects of various types and classes. The system provides interfaces to a variety of services that perform various operations such as reading objects from a persistent storage medium, writing objects to the medium, and maintaining indexes for objects in the database.

In an alternative exemplary embodiment of the invention, data storage system 250 is a repository-based system such as Microsoft Repository, available from Microsoft Corporation. In this embodiment, the repository provides much of the same capability as the objectoriented database described above, and in addition adds a layer of metadata describing the objects. The metadata includes information such as data types of attributes, descriptions of object types, and descriptions of data structures, such as collections.

The invention is not limited to object-oriented databases and repositories, and in further alternative embodiments, data storage system 250 can be based on an entity-relationship model, a semantic data model, and a network data model, all of which are known in the art, and thus such an embodiment will be immediately apparent to one skilled in the art.

While the data storage system 250 has been described in terms of object databases, the underlying physical storage system 270 supporting the object database may be a different type of database. For example, in one embodiment of the invention, a repository database uses as its physical storage system 270 a conventional relational database having tables, and wherein the tables have rows and columns describing and defining the object data.

Application 205 is an application that manipulates objects stored in data storage system 250. In one embodiment of the invention, application 205 is an object-oriented application operating as a client, and data storage system 250 is a server. Application 205 communicates and interfaces with data storage system 250 using software routines defined in client data storage library 215. The routines in library 215, in addition to providing application 205 interfaces to read and write objects from and to data storage system 250, also accomplish the methods described below that implement various strategies to prefetch objects.

The prefetched objects or object data are stored in caches for later access. In one embodiment of the invention, the object data is stored in a client cache 220 maintained by client data storage library 215. In an alternative exemplary embodiment of the invention, a server cache 255 maintained by the data storage system 250 is used to store prefetched object data. In another alternative embodiment of the invention, a storage cache 275 maintained in the physical storage system 270 is used to store prefetched data. In yet another alternative embodiment of the invention, a client cache 220, a server cache 255, and a storage cache 275 are used to store prefetched object data. In a further alternative embodiment, where the data storage system is Microsoft Repository, a server cache and a storage cache are used to store prefetched data. In this embodiment, the storage cache is a temporary table that contains the results of queries. The server cache is a main memory cache. Those of skill in the art will appreciate that various combinations of cache structures are possible and within the scope of the invention.

Figure 3:
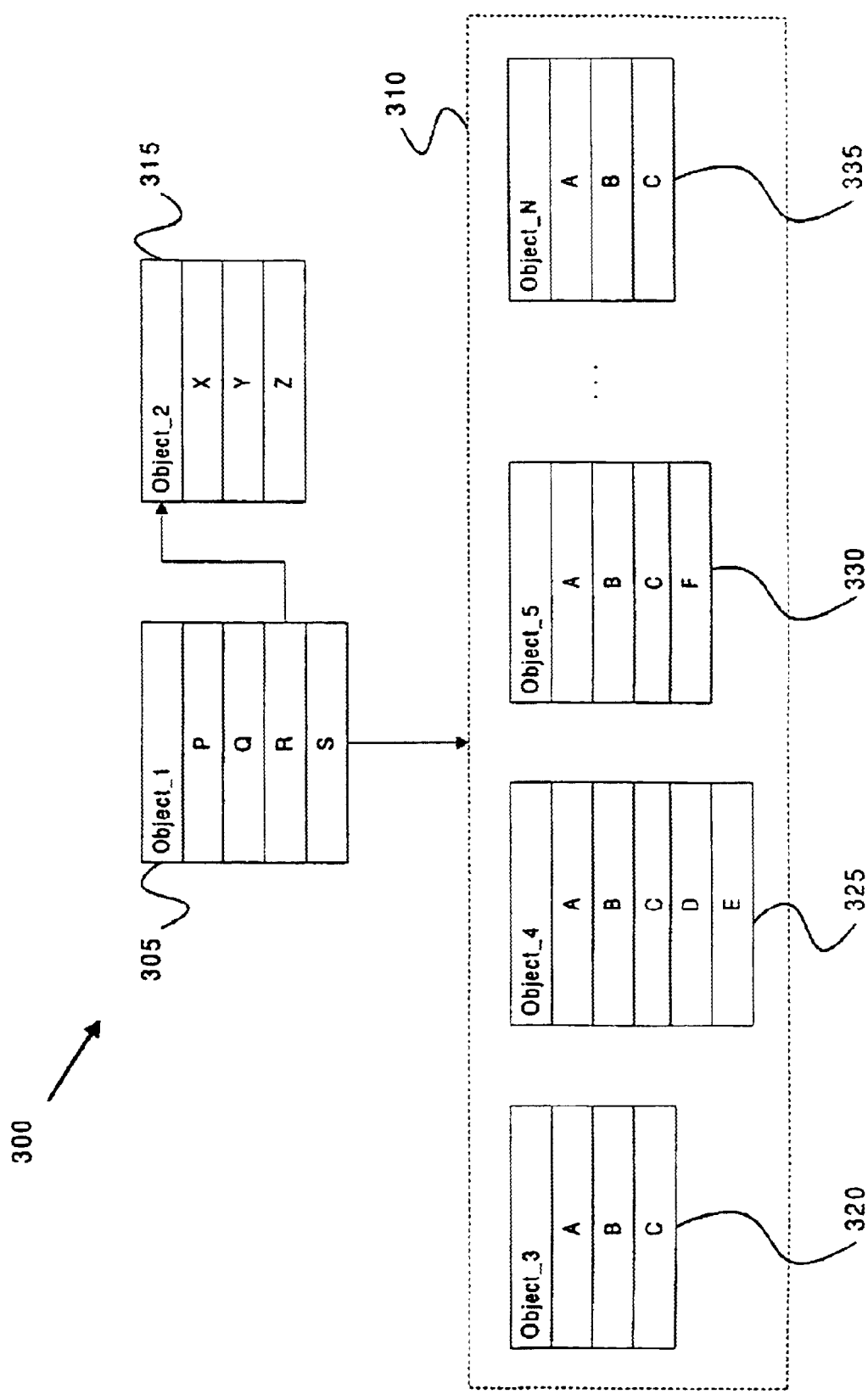
FIG. 3 is an exemplary object hierarchy demonstrating various object and attribute relationships operated on by an exemplary embodiment of the invention.

In FIG. 3, an exemplary object hierarchy 300 is presented. The object hierarchy 300 includes a base object 305, a related object 315, and an object structure 310 containing a set of objects 320, 325, 330 and 335. Each of the objects 305, 315, 320, 325, 330 and 335 has a particular set of attributes determined by the object's type, with base object 305 having attributes P, Q, R and S. Attribute R of base object 305 specifies a relationship to related object 315, and attribute S of base object 305 specifies a relationship to object set 310. The object hierarchy 300 is presented to illustrate how the components and methods of various embodiments of the invention perform prefetching, however the invention is not limited to any particular object hierarchy or relationship structure. In particular, the relationship structure need not be hierarchical but rather may include network structures with multiple paths between objects or cyclic paths from an object back to itself. Those skilled in the art will appreciate that variations in the attributes and relationships are possible and within the scope of the invention.

Typically the objects maintained by the data storage system 250, such as objects 305, 315, 320, 325, 330 and 335, have an object identifier associated with them. The object identifier uniquely identifies the object. Several types of identifiers are possible. For example, in one embodiment of the invention, the identifier is a globally unique identifier. This type of identifier can be used to reference an object anywhere in a distributed computer system, including systems such as the three-tier environment shown in FIG. 2. In an alternative embodiment of the invention, a locally unique identifier is associated with each object. This type of identifier can be used to reference objects in a particular database or data storage system. The identifier is guaranteed to be unique only within the particular database. In yet another alternative embodiment, each object has an identifier comprising an execution-specific pointer that references the object. The pointer is unique to the program while it is running, and cannot be used after the program terminates.

The system components described above operate as follows. Application 205 calls one or more functions to establish a session with data storage system 250. At some point during the session, application 205 requests access to an object in structure 310. For example, the application may request access to object 320. Data storage system 250 retrieves the desired object, and executes one or more prefetch strategies described in detail in the next section below. The prefetch strategies cause relevant object data to be placed in either the client cache 220, the server cache 255, or the storage cache 275.

The set of relevant object data varies depending on the prefetch strategies employed. In one embodiment of the invention, the prefetch strategy fetches attribute data for each object in an object structure based on the attribute accessed in the first accessed object in the object structure. As noted above, object structures contain a group of objects that are organized according to a particular data structure. This data structure can include a collection (also referred to as a set), sequence, array, table, or record structure. In one exemplary prefetch strategy, if attribute A is accessed in one object of an object structure, then attribute A is prefetched for every object in the object structure. In the scenario described above, if data for attribute A in object 320 was requested by an application, then data for attribute A in objects 325, 330, and 335 would be prefetched too and held in a cache such as client cache 220 or server cache 255.

In an alternative embodiment of the invention, the prefetch strategy fetches attribute data for other attributes of an object. For example, if data for attribute P is accessed in object 305, then data for attributes Q, R and S in object 305 are also fetched in anticipation of later use by the application.

The methods used to implement the prefetch strategies discussed above along with additional prefetch strategies are described in detail in the next section. In general, the methods take advantage of the fact that once the fixed overhead cost has been incurred on an access to the data storage system, data items in addition to the one requested by an application can be prefetched for a relatively low incremental performance cost. By prefetching and caching data items, the high fixed overhead cost is avoided on subsequent accesses to the cached items.

Figure 2:
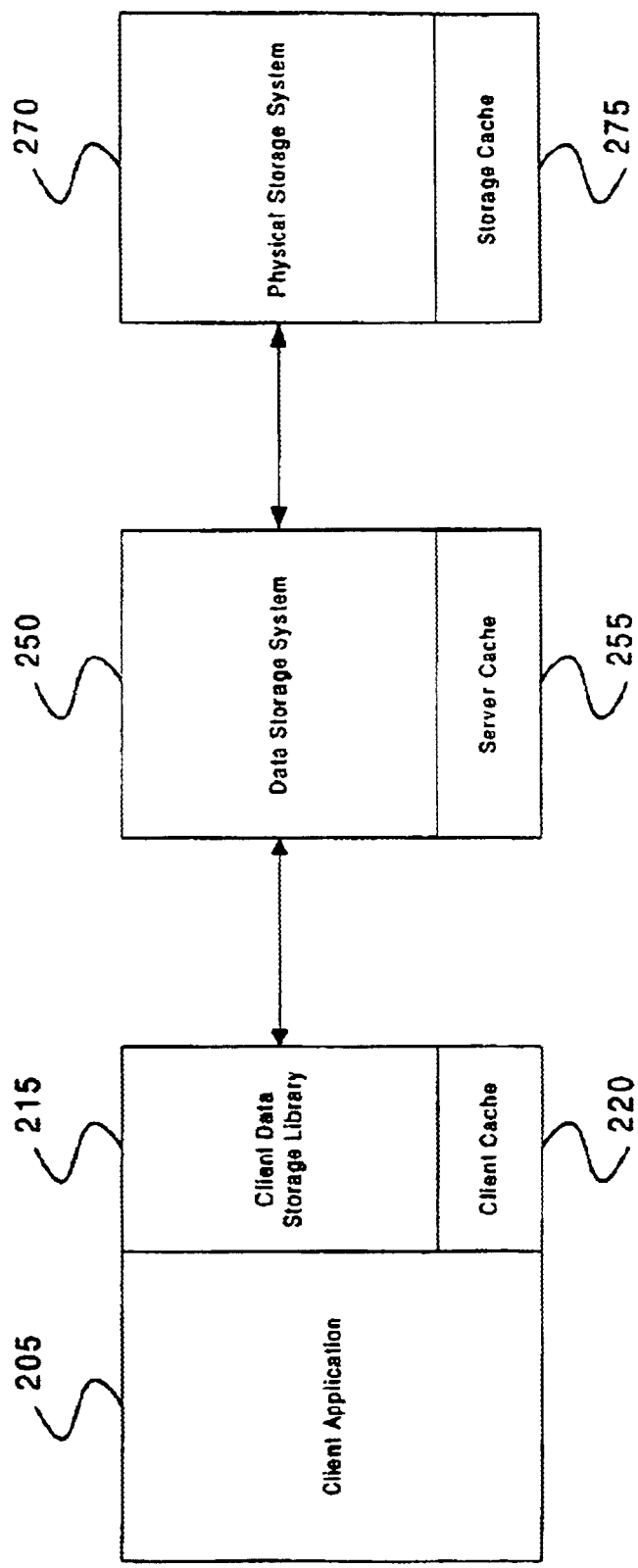
FIG. 2 is a diagram illustrating a system-level overview of exemplary embodiments of a prefetch system.

The system shown in reference to FIG. 2 has been described in terms of a three-tier architecture operating in a virtual memory environment, as is common and known in the art. However, the invention is not limited to three-tier architectures. For example, the above-described components could also be implemented in a client-server architecture where a data storage engine is provided as a component of an application and accesses a remote physical storage system. Also, the invention can be implemented in a multiple tier architecture having more than three tiers. Additionally, the invention is not limited to virtual memory environments.

Methods of an Exemplary Embodiment of the Invention

In the previous section, a system level overview of the operation of an exemplary embodiment of the invention was described. In this section, the particular methods of the invention performed by an operating environment executing an exemplary embodiment are described by reference to a series of flowcharts shown in FIGS. 4–7. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 4–7 are inclusive of the acts required to be taken by an operating environment executing an exemplary embodiment of the invention.

In FIG. 4, a method implementing a prefetch strategy according to one embodiment of the invention is shown. The method is invoked when an application accesses a data storage system to fetch an initial object from a structure (block 405). The structure can be any of the types of structures discussed above, i.e. a collection, set, array, table, record or other data structure capable of grouping one or more objects.

In one embodiment of the invention, the structure containing the initial object is part of the state of a related object, where the state is identified by a structure reference specified in the related object. In an alternative embodiment of the invention, the structure containing the initial object is the result of a query to the data storage system. The query is a logical formula that specifies a subset of the objects in the data storage system to retrieve, i.e. the set of objects that satisfy the query. In a further alternative embodiment, the query is a predefined function that retrieves all objects that are instances of a class or an object type. In a still further embodiment of the invention, where the data storage system implements the Microsoft Repository application programming interface (API), the function used to query the data storage system is the "ExecuteQuery" function. In a still further embodiment of the invention, where the data storage system uses the Microsoft Repository API, the predefined query that retrieves objects that are instances of a class or type is the "ObjectInstances" function, which returns objects that are COM (Microsoft Component Object Model) objects and are either instances of a particular class or instances of any class that supports a given interface.

Those skilled in the art will appreciate that any method or function that returns a result set containing one or more objects may be used to generate the structure.

A structure context description is then created that identifies the object structure containing the initial object (block 410). This allows the system to "remember" the object structure first used to access the initial object (i.e. the initial object's structure context). In one embodiment of the invention, the structure context description comprises an identifier for the initial object and the object structure name. In an alternative embodiment, the structure context description comprises the identifiers for all of the objects in the object structure. In still another alternative embodiment, the structure context description comprises the identifier of another structure that contains the identifiers for all of the objects in the object structure. In yet another alternative embodiment, the structure context description is maintained as a collection of objects, using collection definitions and mechanisms supported by the objectoriented database.

In a still further embodiment of the invention, the data storage system uses an underlying physical storage system that consists of a relational database containing a plurality of tables where the data storage system stores objects and their states. In one such embodiment, the data storage system stores object relationships in a relationship table and scalar valued attributes in a separate table. The structure context description contains enough information to retrieve all of the rows in the relationship table that describe all of the items in the structure. In another such embodiment, the data storage system stores object relationships and attributes in the same table, and the structure context description contains enough information to retrieve all of the rows in the combined relationship and attribute table that describe all of the items in the structure.

Those skilled in the art will recognize that any mechanism that allows the object structure containing the initial object to be rebuilt can serve as a structure context description.

The structure context description created at block 410 can be stored in a variety of locations. For example, in one embodiment of the invention, the structure context description is stored in the memory of the client application program. In an alternative embodiment, the structure context description is stored in memory allocated to the data storage system program. The memory can either be non-persistent (i.e. RAM) or persistent memory, such as a disk. In a further alternative embodiment of the invention where a relational database is used as the physical storage system underlying the data storage system, the structure context is stored as a table in the database and the structure context description is the name of that table. It is desirable to store the structure context in the physical storage system, so that the structure context does not need to be re-built later (which would incur computational expense) and does not need to be sent by the data storage system to the physical storage system (which would incur extra communication expense) when it is needed to guide a prefetch of attributes of objects in the structure context.

After creating a structure context description, the method then waits for the application to access a particular attribute (referred to as "A") of an initial object (referred to as "O") (block 415). Upon accessing attribute A, the data storage system then prefetches data for the corresponding attribute A for all of the objects in O's structure context, using O's structure context description to identify the appropriate objects (block 420). The prefetched attribute data is held in a cache in anticipation of later use by the application.

The following sample scenario illustrates the above-described method of one exemplary embodiment of the invention. An object structure comprising a collection of objects representing employees in a department is stored in the persistent storage of an object repository. Each object is of the same type, i.e. an employee type, and each object has an attribute specifying the employee's salary. An application desires to calculate statistics on the department's employees, including salary information. The application therefore iterates through the collection, fetching the salary attribute for each object.

When the collection of employee objects for the given department is accessed, the data storage system creates a structure context description used to identify and later to recreate that collection (i.e. structure) and associates that structure context description with each object in the collection. On the first access to the salary attribute of an object in the collection, it returns the salary attribute value to the application. In addition, the data storage system prefetches the salary attribute for the other objects in the collection of objects, using the structure context description to identify the required objects. The salary attribute data is held in a cache on the assumption that since the application wanted the salary attribute for one object in the collection, it will want it for all the objects in the collection.

In the above-described scenario, the fixed overhead cost of accessing persistent storage for the salary attribute is incurred only once, on the initial access to the salary attribute of the first object. The salary attributes of the remaining objects in the collection are prefetched and incur only a minimal incremental cost.

In an embodiment of the invention where the client access is a query, the data storage system executes the query and returns the result of the query to the client application in a structure. In addition, the data storage system saves a copy of the structure that it returned to the application. The data storage system saves the copy in the data storage system's cache or in the underlying physical storage system. The structure context description of objects in the query result is the identifier of the query result that is saved by the data storage system. As explained earlier, it is desirable to save the structure so that the query does not need to be re-executed later or sent by the application to the data storage system when the structure is used later to guide a prefetch of attributes of objects in the structure.

In an embodiment of the invention where the client access is a query and a relational database is used to implement the physical storage system, the data storage system executes the query and saves it as a structure context in the form of a table in the database. It is desirable that the table is a temporary table, however the invention is not so limited. Prefetching an attribute A for all objects in the structure is accomplished by performing a join of the structure context table with the attribute table containing attribute A. The attribute table may be a relationship table or a scalar value table. Performing a join is desirable because the table containing the structure context is already in the database system when it is needed for the prefetch, rather than existing in the client application's memory. In addition, the structure context is in the database's optimal format (i.e. a table) and therefore does not have to be reformatted or restructured in order to perform the prefetch.

In an alternative embodiment of the invention (not shown), the prefetching of attribute A for the object in the structure is performed asynchronously with respect to the access to A in the initial object. In other words, attribute A is returned to the application before the prefetch is completed, thus allowing the application to proceed without any delay due to the prefetch.

In FIG. 5, a prefetch strategy of an alternative embodiment of the invention is shown. The method begins when an application issues a call to a function to access a component of the state of an object (block 505). As discussed above, the component can be an attribute (scalar values and object references) or a structure of object O. The data storage system then retrieves the desired component of the state of an object O and returns it to the caller (block 510). At this time, the data storage system also prefetches additional components of the state of object O (block 515). In one embodiment of the invention, only those components having a low incremental cost are prefetched. The prefetched components are held in a cache for later use by the application. In this method, the prefetch strategy operates on the assumption that if the user desires one attribute of an object, the user will also need other attributes in the object.

In an alternative embodiment of the invention, the data storage system described above uses the Microsoft Repository object model, where the objects stored in the repository are Microsoft COM objects, each object is an instance of a COM class, and the state of each object is organized according to the interfaces of its class. The state consists of its structures, which are the collections implemented by its class's interfaces, and its attributes, which are properties implemented by its class's interfaces. Per the method described above, when an application accesses a component of the object's state, where that component is a collection or property of an interface, the repository prefetches all of the components supported by the interface or all of the components of the same kind (i.e. all of the collections or all of the properties) supported by the interface. For example, when an application accesses a property in the object's state, where that property is a member of an interface, the repository prefetches all of the properties supported by the interface.

A method implementing a prefetch strategy of a further alternative embodiment of the invention is shown in FIG. 6. An application provides a "hint" to the data storage system indicating how or what it wants the data storage system to prefetch (block 605). The hint can be provided in several ways. In one embodiment of the invention, the hint is passed as a parameter to an access operation. In an alternative embodiment, the hint is provided in a separate operation from access operations. In a further alternative embodiment of the invention, the hint is contained in an environment variable set by the caller. In yet another alternative embodiment, the hint is provided as a label on a structure type or other type within the class definition for an object, such as the value of an attribute of the class definition. Those skilled in the art will recognize that alternative mechanisms for providing the hint exist and that any or all of the above-described mechanisms could be used in combination with one another.

The application then calls a function to access a component of the object state (block 610). The data storage system fetches the desired component and returns it to the caller (block 615). In addition, the data storage system then looks at the previously provided hint to determine what, if anything, to prefetch (block 620). The prefetched items specified in the hint can include other objects in a structure containing the accessed object and other attributes or state components of the accessed object.

Figure 7:
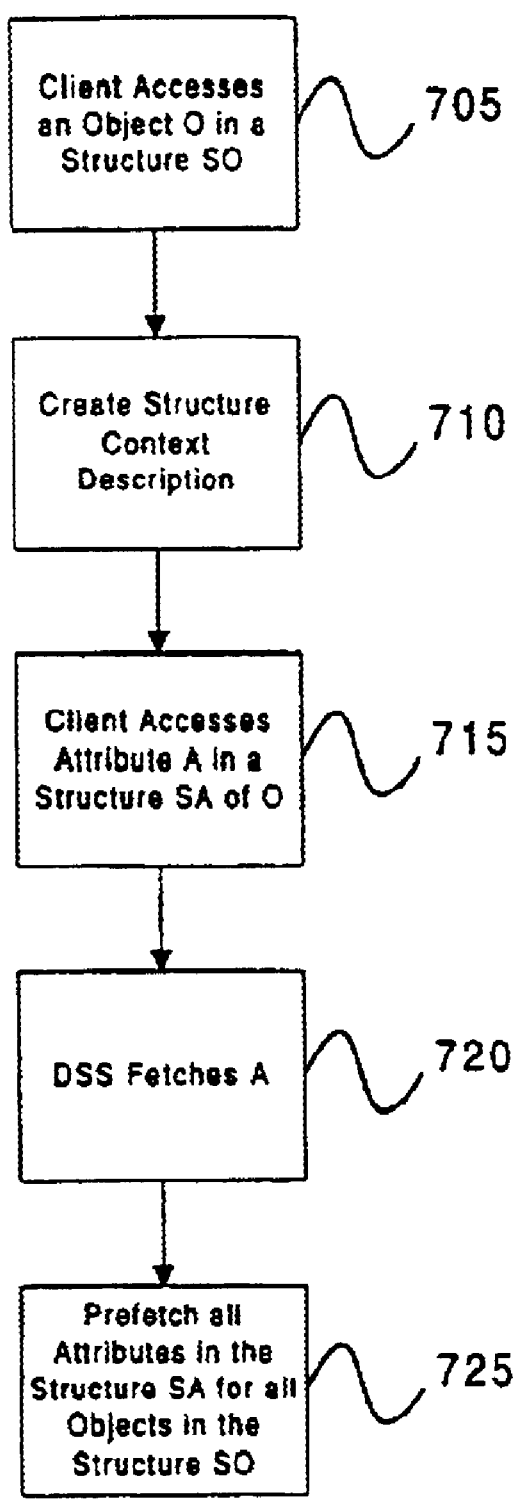

A flowchart of a method implementing a prefetch strategy of a still further embodiment of the invention is shown in FIG. 7. Like the method illustrated in FIG. 4, the method in FIG. 7 begins when an application accesses an object O in an object structure SO (block 705). The data storage system creates a structure context description to identify the objects in the object structure (block 710). The structure context description can be created using any of the mechanisms described above in reference to FIG. 4. The client application then accesses an attribute A of object O, where A is contained in a structure SA (block 715). The data storage system fetches the attribute and returns it to the calling application (block 720). In addition, the data storage system prefetches other attributes contained in the structure SA containing attribute A (block 725) for all objects in object O's structure context SO.

In an alternative embodiment of the invention, the data storage system described above uses the Microsoft Repository object model, which was described earlier. Thus, per the method described above, when an application accesses a property A (also referred to as an attribute in block 715) of a COM object, the repository prefetches all of the properties supported by the interface containing A for all of the objects in the COM object's structure context (block 725).

In the above-described methods, the structure context and structure context description are used to remember aspects that are helpful in executing prefetch strategies. In one embodiment of the invention, the structure context description is deleted when the system determines that it will no longer be asked to prefetch attributes or objects based on the structure context. In another embodiment where the structure context is physically stored, such as the result of a query, both the structure context and structure context description are deleted when the system determines that it will no longer be asked to prefetch based on the structure context. Varying mechanisms can be used to make the determination. For example, in one embodiment of the invention, the structure context is deleted when there are no longer any objects that reference the structure context. In an alternative embodiment of the invention, the structure context is deleted when a connection to the data storage system is terminated. In a further alternative embodiment, the structure context is deleted when the session is terminated. In another alternative embodiment, the structure context is deleted when the application generating the query is terminated. In a still further alternative embodiment, the structure context is deleted when the results of the query generating the structure are released.

In the above-described methods, reference is made to prefetching attributes. In an embodiment of the invention, structures are prefetched, either in addition to, or instead of the attributes.

For example, an application may access an object containing employee related data such as the home, work, and fax telephone numbers for the employee. The phone number data is held as a collection of attributes, where each attribute represents one of the phone numbers. In addition, there exists a collection of employees that belong to the same department. When the application first accesses a phone number collection for one employee object, the phone number collections for all employee objects in the department collection are prefetched.

Those skilled in the art will appreciate that the above-described methods are not mutually exclusive. The prefetch strategies can be combined in various ways to provide a number of improvements to the performance of the data storage system when fetching an object's state.

In addition, the prefetched objects, attributes and structures may be held in various persistent and non-persistent memory areas of the components described above in reference to FIG. 2. For example, in one embodiment of the invention, the prefetched objects are stored in a client side cache. In an alternative embodiment, the prefetched objects, attributes, and structures are held in a cache, such as the client cache 220, the server cache 255, or the storage cache 275 shown in FIG. 2. In a further alternative embodiment, the prefetched objects, attributes, and structures are held in a combination of two or more of the above-referenced caches.

The particular methods implementing prefetch strategies performed by an operating environment to support various exemplary embodiments of the invention have been described. The methods have been shown by reference to a series of flowcharts including all the steps from 405 until 420, from 505 until 515, from 605 until 620, and from 705 until 725. The methods provide an efficient mechanism for prefetching and caching objects and object data retrieved from data storage systems.

Microsoft COM and Microsoft Repository Implementation

In this section of the detailed description, a particular implementation of the invention is described that is implemented in Microsoft Repository. In addition, a particular implementation is described that incorporates Microsoft Component Object Model (COM) objects within the repository.

Microsoft Repository is a data storage system that supports the storage of objects and metadata about the stored objects. Microsoft Repository exposes a set of COM interfaces that a developer can use to define and access information models consisting of complex networks of inter-related COM Automation objects and collections. The repository engine encapsulates the mapping of COM Objects to an underlying storage representation for these information models. The repository engine sits on top of either Microsoft SQL Server or Microsoft Jet. The engine offers a rich extensibility framework, which enables the attaching of custom behavior to information model objects. In addition to data storage, Microsoft Repository supports version management, configuration management, and workspace management for the data.

Microsoft's COM (Component Object Model) is an example of a software component model. COM is a component environment commonly used by applications written in Microsoft's Visual Basic, Visual C++, and Visual J++ programming languages. COM can generally be defined as a specification for object data structures and an API that allows software objects to communicate and interact with each other and to be dynamically interchanged.

Each COM object is an instance of a particular COM class, and each class implements a set of interfaces. Interfaces must be defined according to certain standards and rules. Classes must be written using certain standards and rules to implement the interfaces that objects of that class expose to other objects or applications that they communicate with.

Each COM interface defines a set of member functions that are implemented by each object that implements the interface. These member functions can include functions to read and write attributes, which are called "properties" in COM. Since a COM interface can implement a set of attributes, it is a structure. The value of an attribute of an interface can be a structure, an object or a scalar value. The structure type that is most commonly defined on a COM interface is the collection. A collection can contain objects or scalar values.

A COM object has attributes and structures. Its attributes are the attributes of the interfaces it implements. Its structures are the interfaces it implements and the collection-valued attributes of those interfaces. An implementation of Microsoft Repository is a data storage system that offers a COM-compatible API for reading and writing attributes of COM objects.

The COM objects, interfaces, properties and collections described above are prefetched according to the methods of the invention described in the previous section. For example, an application will typically retrieve an object and then access a property of an interface of the object. Using the method of the invention described in reference to FIG. 5 above, the repository, upon accessing one property of an interface, will prefetch the other properties of the same interface. Based on user-supplied hints, the repository could also prefetch properties of other interfaces of the same object.

Similarly, if an application retrieves a collection of objects, the repository uses the method described above in reference to FIG. 4 to create a structure context description that remembers which objects belong to the collection.

When accessing a property of one object in this collection, this structure context information can then be used to prefetch the same property for other interfaces in the collection.

The prefetch strategies implemented by the methods described above provide a faster and more efficient mechanism to access the properties and collections of a COM object that is stored in a database. In addition, because the structure context is maintained by the repository, application programs that share an object can take advantage of the prefetched objects and properties initially accessed by another application.

Conclusion

The prefetching and caching of persistent object data has been described. Objects and attributes are prefetched according to one or more strategies that predict which attributes will be useful in the future to an application.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while the prefetching and caching has been described in terms of an object database or repository, that other means of storing persistent objects can be readily substituted. In addition, prefetching has been described in terms of prefetching objects. However, the systems and methods described can be applied to prefetch any data entity serving a similar purpose to objects in an object-oriented environment.

The terminology used in this application is meant to include all of these environments. Therefore, it is manifestly intended that this invention be limited only by the following claims and equivalents thereof.

We claim:

1. A computerized method for retrieving data for an object or related objects prior to an explicit request for access to the data by a computing application comprising the steps of:

creating a structure context description identifying a structure context that comprises a set containing objects, wherein the objects have at least one attribute, wherein the structure context description is stored in a relationship table having a plurality of rows containing items that describe the structure context, wherein the structure context description contains enough information to retrieve all of the rows in the relationship table that describe all of the items in the structure context;

associating the structure context description with each object in the set, wherein the associating step associates the structure context description to each object in the set by creating a unique identifier between the structure context description and each object; and fetching related object data for objects in the set by a data storage system from a physical storage system upon an access to an attribute of one object in the set, wherein the fetching step comprises first retrieving object data requested by the computing application using the attribute, returning the first requested object data to the requesting computing application, retrieving related object data to the first requested object data using the attribute, and placing in cache the related object data for future use by the application.

2. The computerized method as recited in claim 1, further comprising storing the structure context description, wherein the storing step comprises storing said structure context description in any of memory of a client application program, memory allocated to a data storage system, and table of a relational database, wherein said relational database is used as the physical storage system underlying a general data storage system.

3. The computerized method as recited in claim 1, wherein the data storage system is an object repository.

4. The computerized method as recited in claim 3, wherein the object repository implements an application programming interface (API) of Microsoft Repository.

5. The computerized method as recited in claim 4, wherein fetching related object data for the set and accessing an attribute of the first object occur asynchronously.

6. A computerized system comprising:

a computer comprising a processor, a memory, and a computer-readable medium operatively coupled together;

an operating environment executing in the processor from the computer readable medium;

a persistent storage system operative to store objects having attributes, structures, and structure contexts; and a data storage system executing in the processor from the computer-readable medium and under the control of the operating environment, said data storage system operative to maintain objects in the persistent data storage system and further operative to retrieve data for an object or related objects prior to an explicit request for access to the data by a computing application, such that a first object for a requested data item is first retrieved and passed back to the computing application and remaining related objects to the requested data item are then retrieved and placed in a cache by the data storage system for future use by the requesting computing application.

7. A computer-readable medium having computer readable instructions to cause a computer to perform a method comprising:

creating a structure context description identifying a set containing at least one object, the object having an attribute, said attribute having a name, wherein the structure context description is stored in a relationship table having a plurality of rows containing items that describe the structure context, wherein the structure context description contains enough information to retrieve all of the rows in the relationship table that describe all of the items in the structure context;

associating the structure context description with each data item in the object, wherein the associating step associates the structure context description to each object in the set by creating a unique identifier between the structure context description and each object; and fetching related object data for the object in the set by a data storage system from a physical storage system upon an access to an attribute of the object in the set, wherein the fetching step comprises first retrieving object data requested by the computing application using the attribute, returning the first requested object data to the requesting computing application, retrieving related object data to the first requested object data using the attribute, and placing in cache the related object data for future use by the application.

8. A computerize method for retrieving data for an object or related objects prior to an explicit request for access to the data by a computing application comprising the steps of:

creating a structure context description identifying a structure context that comprises a set containing objects, wherein the objects have at least one attribute, and wherein the structure context description contains enough information to retrieve related objects from the object set;

associating the structure context description with each object in the set, wherein the associating step associates the structure context description to each object in the set by creating a unique identifier between the structure context description and each object;

fetching related object data for objects in the set by a data storage system from a physical storage system upon an access to an attribute of one object in the set, wherein the fetching step comprises first retrieving object data requested by the computing application using the attribute, returning the first requested object data to the requesting computing application, retrieving related object data to the first requested object data using the attribute, and placing in cache the related object data for future use by the application; and deleting the structure context after a predetermined length of time, wherein the predetermined length of time occurs when there are no objects in the object set that reference the structure context remembered by the structure context description.

\* \* \* \* \*